U S009291429B2

United States Patent
Roncone (10) Patent No.: US 9,291,429 B2
(45) Date of Patent: Mar. 22, 2016

(54) MULTIMODE SHARED APERTURE SEEKER

(71) Applicant: Raytheon Company, Waltham, MA (US)

(72) Inventor: Ronald L. Roncone, Vail, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 525 days.

(21) Appl. No.: 13/869,225

(22) Filed: Apr. 24, 2013

(65) Prior Publication Data
US 2015/0377590 A1     Dec. 31, 2015

(51) Int. Cl.
| | |
|---|---|
| *F41G 7/22* | (2006.01) |
| *F42B 15/01* | (2006.01) |
| *H04N 5/33* | (2006.01) |
| *H04N 5/225* | (2006.01) |
| *F41G 7/00* | (2006.01) |
| *F42B 15/00* | (2006.01) |

(52) U.S. Cl.
CPC .............. *F41G 7/226* (2013.01); *F41G 7/2246* (2013.01); *F42B 15/01* (2013.01); *H04N 5/2254* (2013.01); *H04N 5/332* (2013.01)

(58) Field of Classification Search
CPC .............. F41G 7/20; F41G 7/24; F41G 7/26; F41G 7/263; F41G 7/22; F41G 7/226; F41G 7/2266; F41G 7/2273; F41G 7/2286; F41G 7/2293; F41G 7/2246; F42B 15/01; H04N 5/222; H04N 5/225; H04N 5/2251; H04N 5/2254; H04N 5/30; H04N 5/33; H04N 5/332; G01S 7/48; G01S 7/481
USPC .............. 244/3.1–3.19; 343/700 R, 720, 721, 343/772, 781 R, 781 CA; 356/3, 4.01; 250/200, 201.1, 203.1, 203.2
See application file for complete search history.

(56) References Cited

U.S. PATENT DOCUMENTS

| | | | | |
|---|---|---|---|---|
| 3,971,939 A | * | 7/1976 | Andressen .............. | F41G 7/226 244/3.16 |
| 5,307,077 A | * | 4/1994 | Branigan .............. | F41G 7/2286 343/781 CA |
| 6,111,241 A | * | 8/2000 | English ................... | F41G 7/226 250/203.2 |
| 6,606,066 B1 | * | 8/2003 | Fawcett .................. | F41G 7/226 343/781 CA |
| 6,924,772 B2 | * | 8/2005 | Kiernan, Jr. ............ | F41G 7/226 343/781 CA |
| 7,183,966 B1 | * | 2/2007 | Schramek ............... | F41G 7/226 244/3.1 |

(Continued)

FOREIGN PATENT DOCUMENTS

GB        2082009 A     2/1982

*Primary Examiner* — Bernarr Gregory
(74) *Attorney, Agent, or Firm* — Lando & Anastasi, LLP (57) ABSTRACT

A multimode shared aperture seeker incorporating a dual-mode diffuser and methods of operation thereof. According to one example, a non-gimbaled multimode seeker includes an IIR seeker including an FPA and an optical system that receives infrared radiation via a system optical aperture and focuses the infrared radiation onto the FPA, and a SAL seeker including a SAL detector positioned in an optical path between the system optical aperture and the FPA and configured to detect laser radiation received via the system optical aperture. The SAL detector is substantially transparent to the infrared radiation. The multimode seeker further includes a dual-mode diffuser positioned in the optical path between the system optical aperture and the optical system. The diffuser is configured to spread the laser radiation to broaden a linear field of view of the SAL seeker, and to transmit the infrared radiation substantially undiffracted to the optical system.

19 Claims, 6 Drawing Sheets

(56) References Cited

U.S. PATENT DOCUMENTS

| | | | |
|---|---|---|---|
| 7,336,345 B2 * | 2/2008 | Krasutsky | G01S 7/481 356/4.01 |
| 7,530,528 B2 | 5/2009 | Jenkins et al. | |
| 8,164,037 B2 | 4/2012 | Jenkins et al. | |
| 8,207,481 B2 | 6/2012 | Taylor et al. | |
| 8,274,027 B2 | 9/2012 | Andressen et al. | |
| 2010/0127174 A1 | 5/2010 | Tener et al. | |
| 2011/0073704 A1 | 3/2011 | Jenkins et al. | |
| 2012/0074295 A1 | 3/2012 | Andressen et al. | |

* cited by examiner

MULTIMODE SHARED APERTURE SEEKER

BACKGROUND

Ordnance such as guided artillery projectiles, guided missiles, and guided bombs, all of which will be referred to herein as "projectiles," may include a variety of imaging or non-imaging sensors to detect and track potential targets. Sensors used to guide projectiles to an intended target are commonly referred to as seekers. Seekers may operate in various portions of the electromagnetic spectrum, including the visible, infrared (IR), microwave, and millimeter wave (MMW) portions of the spectrum. Some projectiles may incorporate multiple sensors that operate in more than one portion of the spectrum. A seeker that incorporates multiple sensors that share a common aperture and/or common optical system is commonly called a multimode seeker.

One type of seeker used in projectiles is a semi-active laser (SAL) seeker to detect laser radiation reflected from an intended target and to provide signals indicative of the target bearing such that the projectile can be guided to the target. The SAL may include an optical system to capture and focus the reflected laser radiation and a detector. In order to provide high sensitivity, the SAL optical system may have a large aperture and high optical efficiency. In order to guide a projectile to a target when laser illumination of the target is not available, the projectile may be equipped with a dual-mode seeker including a SAL seeker and an imaging infrared (IIR) seeker.

Conventional shared aperture dual-mode or tri-mode seekers use Cassegrain-like catadioptic systems. These systems have a relatively narrow field of view, for example approximately ±3°, and are therefore typically gimbaled so as to allow a wider field of regard to be obtained by moving the system. As will be appreciated by those skilled in the art, the term "field of view" refers to the angular coverage that the optical system design supports, while the term "field of regard" refers to the angular coverage that is achievable by gimbaling. For example, the above-mentioned Cassegrain-type systems typically have a field of view of a few degrees, but may have a field of regard of ±30 degrees, with the field of regard limits generally determined by the gimbal design. These systems also have large obscurations which waste a significant portion (for example, approximately 25%) of the collection aperture area.

SUMMARY OF INVENTION

Aspects and embodiments relate to multimode seeker systems for projectiles, missiles, and other ordnance that, in at least one mode, engage targets by detecting and following laser light reflected from the targets. In particular, aspects and embodiments are directed to a multimode shared aperture seeker incorporating a dual-mode diffuser configured to enlarge the linear field of view of the semi-active laser seeker while having little to no impact on the imaging infrared seeker, as discussed in more detail below.

According to one embodiment, a non-gimbaled multimode seeker comprises an imaging infrared (IIR) seeker including a focal plane array detector and an optical system configured to receive infrared radiation via a system optical aperture and focus the infrared radiation onto the focal plane array detector, a semi-active laser (SAL) seeker including a SAL detector positioned in an optical path between the system optical aperture and the focal plane array detector and configured to detect laser radiation received via the system optical aperture, the SAL detector being substantially transparent to the infrared radiation, and a dual-mode diffuser positioned in the optical path between the system optical aperture and the optical system, and configured to spread the laser radiation to broaden a linear field of view of the SAL seeker, the diffuser further configured to transmit the infrared radiation substantially undiffracted to the optical system.

In one example the diffuser includes a substrate having a pattern of features on a surface thereof, the pattern of features configured to diffract the laser radiation substantially without diffracting the infrared radiation. The feature size of the pattern of features may be in a range of approximately 1-2 microns, for example. In this example, the laser radiation may have a wavelength of approximately 1.064 microns, and the infrared radiation may include wavelengths in a range of approximately 8-12 microns. In one example the substrate is barium fluoride. In one example the optical system includes a pair of lenses. The multimode seeker may further comprise a window that is substantially optically transparent to the infrared radiation and the laser radiation. In one example the diffuser is configured to broaden the linear field of view of the SAL seeker to approximately ±12°.

According to another embodiment, a method of operating a non-gimbaled multimode seeker comprises acts of receiving infrared radiation and laser radiation through a common aperture, passing the infrared radiation substantially undiffracted through a dual-mode diffuser, and focusing the infrared radiation onto an imaging detector, diffracting the laser radiation with the dual-mode diffuser to broaden a beam diameter of the laser radiation, and detecting the diffracted laser radiation with a semi-active laser (SAL) detector.

In one example focusing the infrared radiation onto the imaging detector includes passing the infrared radiation through the SAL detector. In another example receiving the infrared radiation and the laser radiation includes passing the infrared radiation and the laser radiation though a window that is substantially optically transparent to the infrared radiation and the laser radiation. In another example receiving the infrared radiation and the laser radiation includes receiving infrared radiation in wavelength range of approximately 8-12 microns, and receiving laser radiation having a wavelength of approximately 1.064 microns. In one example diffracting the laser radiation includes broadening the beam diameter of the laser radiation to produce a linear field of view of the SAL detector of approximately ±12°.

According to another embodiment, a non-gimbaled multimode seeker comprises an infrared imaging detector configured to detect focused incident infrared radiation received via a common aperture and to generate at least one infrared guidance signal therefrom, a positionally-sensitive semi-active laser (SAL) detector having a spatial transfer function that converts a spatial displacement of a spot of laser radiation to a target bearing to generate at least one SAL guidance signal, the laser radiation being received via the common aperture, and a dual-mode diffuser positioned in an optical path between the common aperture and the SAL detector and the infrared imaging detector, and configured to diffract the laser radiation to increase a size of the spot of laser radiation on the SAL detector to set the spatial transfer function, and further configured to pass the infrared radiation substantially undiffracted to the infrared imaging detector.

In one example the multimode seeker further comprises an optical sub-system positioned between the dual-mode diffuser and the infrared imaging detector and configured to focus the infrared radiation onto the infrared imaging detector. The SAL detector may be positioned in the optical path between the dual-mode diffuser and the infrared imaging detector and may be configured to be substantially optically transparent to the infrared radiation. The dual-mode diffuser may include a substrate having a pattern of features on a surface thereof, the pattern of features configured to diffract the laser radiation substantially without diffracting the infrared radiation. In one example, the infrared radiation includes wavelengths in a range of approximately 8-12 microns, and the laser radiation has a wavelength of approximately 1.064 microns.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a multimode semi-active laser (SAL) seeker in which all modes share a common aperture, referred to as a shared aperture seeker. In particular, aspects and embodiments are directed to a dual-mode system that includes a SAL seeker and an imaging infrared (IIR) seeker. As discussed above, conventional shared aperture dual-mode systems are typically narrow field of view (FOV) gimbaled systems, which may have several disadvantages including large size and relatively poor collection aperture efficiency. Aspects and embodiments are directed to a shared aperture multimode seeker in which a diffractive diffuser is used to expand the SAL linear field of view without substantially impacting the imaging in the IIR seeker, thereby providing a multimode seeker that is suitable for use in non-gimbaled (also referred to in the art as "strap-down" or "fixed-post") systems. Such a configuration allows both modes of operation (SAL and IIR) to fully utilize the full aperture of the optics, which may be particularly important for achieving maximum target detection range in both modes, while also minimizing the space requirement of the seeker system.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
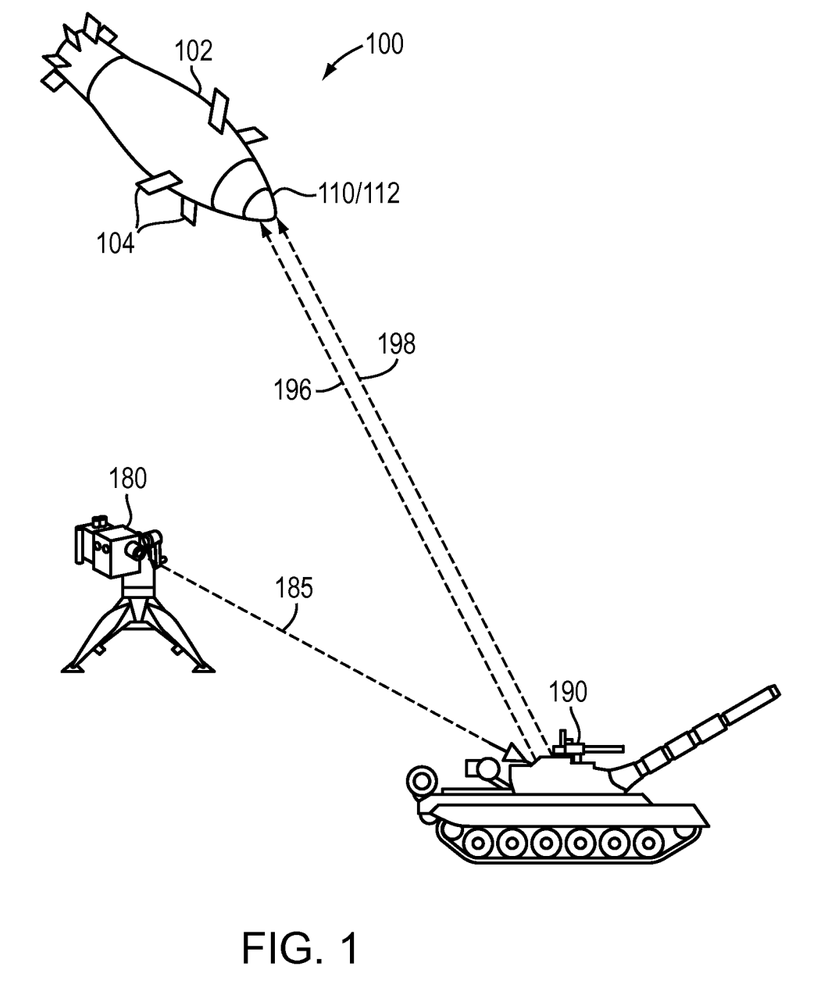
FIG. 1 is a schematic illustration of a laser guided projectile engaging a target.

Referring to FIG. 1, a projectile 100 may include a projectile body 102, control surfaces 104, and a guidance system (not shown). The guidance system may include a multimode seeker system 110, of which only a transmissive dome 112 is visible in FIG. 1. The guidance system may include a flight control system (not shown) to control the flight of the projectile 100 by manipulating one or more control surfaces 104 based on at least one guidance signal from the multimode seeker. In the example of FIG. 1, the control surfaces 104 are shown as canards, but may be fins, wings, ailerons, elevators, spoilers, flaps, air brakes or other controllable devices capable of affecting the flight path of the projectile 100.

The multimode seeker system 110 may include a SAL seeker to allow the projectile 100 to engage a target 190 by detecting and following reflected laser radiation 196 from the target 190. In FIG. 1, the target 190 is represented as a tank, but may be another type of vehicle or a structure, building or other stationary object. The target 190 may be illuminated with laser radiation 185 from a laser designator 180. The laser designator 185 may be located on the ground, as shown in FIG. 1, or may be located in a vehicle or aircraft. The reflected laser radiation 196 may be a portion of the illumination laser radiation 185.

The multimode seeker system 110 may also include an IIR seeker receptive to infrared radiation 198 radiated from the target 190 and the surrounding scene. When a laser designator 180 is not available to illuminate the target 190, the projectile 100 may be guided to the target using guidance signals from the IIR seeker.

Figure 2:
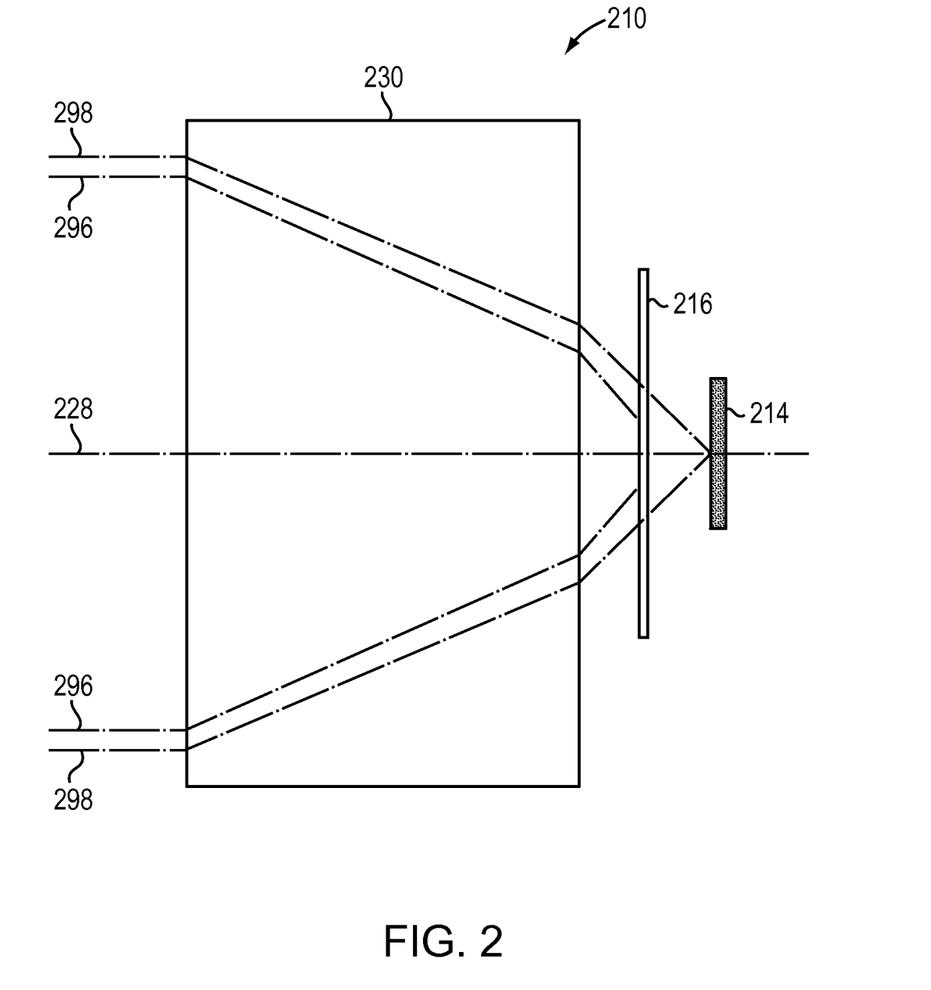
FIG. 2 is a block diagram of a multimode seeker.

Referring to FIG. 2, a multimode seeker 210 may include an infrared focal plane array detector 214, a laser energy detector 216, and an imaging optical system 230. The imaging optical system 230 and the laser energy detector 216 may collectively form a SAL seeker. Laser energy reflected from a target may be softly focused by the imaging optical system 230 upon the laser energy detector 216. Specifically, laser energy reflected from a point in the scene may form an extended spot having at least a predetermined diameter at the laser energy detector 216, as discussed further below. Rays 296, shown as dash-dash-dot lines, are examples of laser rays forming an extended spot at the laser energy detector 216.

Commonly, SAL seekers detect laser energy having a wavelength of 1064 microns; however, other laser wavelengths may be used.

The laser energy detector 216 may convert incident laser energy into electrical signals indicative of an angular bearing to a designated target. For example, the laser energy detector 216 may be a quadrant detector that provides four electrical signals indicative of the amount of laser energy incident on each of four quadrants of the detector. The bearing to the designated target may then be determined from the relative strength of each of the four signals.

The imaging optical system 230 and the infrared focal plane array 214 may collectively form an IIR seeker. Infrared radiation from a scene may be focused by the imaging optical system 230 to form an image of the scene upon the focal plane array detector 214. Rays 298, shown as dash-dot-dot lines, are examples of IR rays imaged onto the focal plane array detector 214.

The focal plane array detector 214 may convert incident IR radiation into electrical signals that may be analyzed by a signal processor (not shown) to detect and track targets. The focal plane array may be sensitive to IR radiation within a selected portion of the IR spectrum, such as radiation having a wavelength of 3-5 microns, 8-12 microns, or some other portion of the infrared spectrum. In one example, the focal plane array detector 214 is a long-wave infrared (LWIR) detector, sensitive to radiation in the 8-12 microns spectral band. In some examples, the focal plane array detector 214 may be disposed within a thermally insulating enclosure, such as a cryo-vac Dewar, for example, such that the detector may be cooled below ambient temperature to reduce thermal noise; however, in other examples, the focal plane array detector 214 may be uncooled.

The laser energy detector 216 may be disposed along the optical path of the IIR seeker such that infrared radiation, such as rays 298, must pass through the laser energy detector to reach the infrared focal plane array detector 214. As discussed above, in certain embodiments the multimode seeker 210 is a shared aperture seeker, and accordingly, the optical aperture of the SAL seeker and the IIR seeker may be essentially the same. In the example of FIG. 2, the laser energy detector 216 is positioned along the optical axis 228 between the imaging optical system and the infrared focal plane array detector 214. The laser energy detector 216 may be positioned within the imaging optical system. In either case, the laser energy detector must be substantially transparent for the selected portion of the IR spectrum used by the IIR seeker. In this context, "substantially transparent" means that a large portion of energy with the selected portion of the IR spectrum is transmitted through the laser energy detector. A laser energy detector may be considered as "substantially transparent" if the portion of infrared energy transmitted through the laser energy detector is sufficient to allow the IIR seeker to meet predetermined performance requirements. Such a laser energy detector may be referred to as a transmissive semi-active laser (TSAL) energy detector.

According to one embodiment, the laser energy detector 216 includes a semiconductor substrate on which at least one photodetector is formed. As discussed above, in some examples the laser energy detector 216 may be a quadrant detector, and may therefore include four photodetectors configured to detect laser radiation incident on four respective quadrants of the semiconductor substrate. Four electrodes may be formed on a first side of the semiconductor substrate to make electrical contact to respective photodetector devices, and a single electrode may be formed on a second side of the semiconductor substrate to make a common electrical contact to the photodetector devices. The photodetector devices may be junction photodiodes, pin photodiodes, avalanche photodiodes, or other photodetector devices. The semiconductor substrate may be made of a material suitably optically transparent to the selected portion of the IR spectrum used by the IIR seeker. For example, the semiconductor substrate may be silicon.

In some circumstances, even though the semiconductor substrate may be non-absorbing for the portion of the IR spectrum used by the IIR seeker, the substrate may have a high index of refraction at certain IR wavelengths, and therefore a significant amount of IR radiation may be reflected at the surface of the substrate. To address this concern and reduce reflections of incident IR radiation at the surface of the semiconductor substrate, the substrate may be coated with one or more layers of an anti-reflective coating. In some examples, the semiconductor substrate may be coated with a multi-layer dielectric coating on the front surface (the surface facing the incident laser and infrared radiation) of the laser energy detector which may also be antireflective at the laser wavelength. Conversely, a multilayer dielectric coating may be disposed on the back surface (the surface facing the infrared focal plane array detector) of the laser energy detector that is reflective at the laser wavelength, such that incident laser energy transmitted through the laser energy detector is directed back through the laser energy detector. Thus the coating on the front side of the laser energy detector may be configured to be antireflective for both the laser wavelength and the portion of the infrared spectrum used by the IIR seeker. The coating on the back side of the laser detector may be antireflective for the portion of the infrared spectrum used by the IIR seeker and to be highly reflective at the laser wavelength. Both antireflective and reflective coatings may be implemented by depositing one or more layers of dielectric materials onto the surface of the semiconductor substrate, optionally covering the photodetector element(s).

Commonly-owned U.S. Pat. No. 8,274,027 to Andressen et al. titled "TRANSPARENT SILICON DETECTOR AND MULTIMODE SEEKER USING THE DETECTOR," which is herein incorporated by reference in its entirety, discloses examples of TSAL detectors including multi-layer dielectric coatings and configured to be highly optically transparent to infrared wavelengths. The laser energy detector 216 may be implemented using any of the techniques and embodiments discussed in U.S. Pat. No. 8,274,027, for example.

Figure 3A:
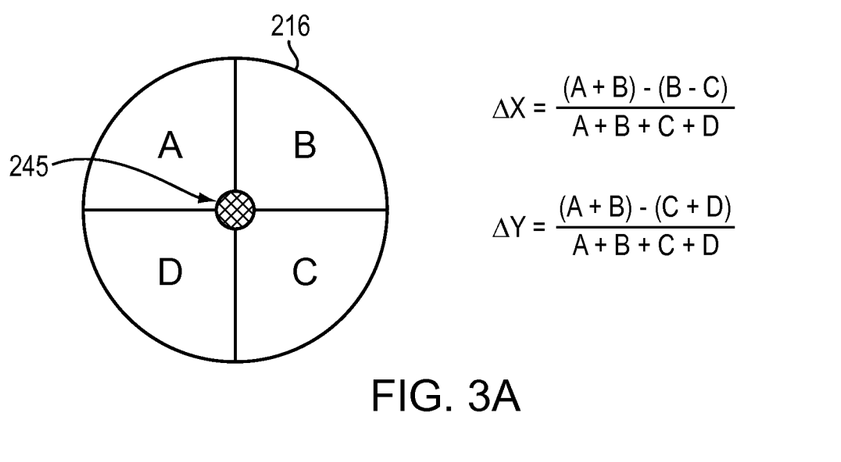
FIG. 3A is schematic diagram of one example of a quadrant SAL detector.

FIG. 3A illustrates schematically a frontal view of one example of a quadrant laser energy detector 216 and a focused laser energy spot 245 incident thereon. As discussed above, the laser energy detector 216 may comprise four quadrants A, B, C, D. Each quadrant may produce a corresponding signal A, B, C, and D in response to the laser energy incident upon each quadrant. Guidance signal ΔX may indicate an imbalance between the laser energy incident upon the left (quadrants A and B) and right (quadrants C and D) halves of the laser energy detector 216. Guidance signal ΔY may indicate an imbalance between the laser energy incident upon the top (quadrants A and C) and bottom (quadrants B and D) halves of the laser energy detector 216. The terms "left," "right," "top," and "bottom" refer to the laser energy detector 216 as shown in FIG. 3A and do not imply any physical orientation of the laser energy detector 216 within a projectile such as the projectile 100. When the laser spot 245 is centered on the laser energy detector 216, the signals A, B, C, D may be essentially equal and the guidance signals ΔX and ΔY may both be zero or nearly zero. The laser energy detector 216 may be a single quadrant or monolithic design that is positionally sensitive.

Figure 3B:
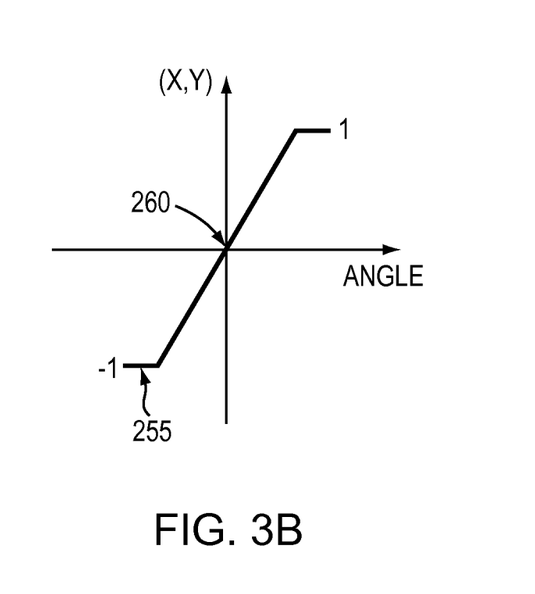
FIG. 3B is a graph of the ideal transfer function of the SAL detector of FIG. 3A for a field of view about boresight.

In one example, the laser energy detector 216 may effectively measure the centroid of the incident laser energy on the laser energy detector 216. As shown in FIG. 3B, the transfer function 255 is a ratio of the energy on the different quadrants of the detector. When energy in spot 245 is hitting all four quadrants A-D, the guidance system operates in a "linear" region 260 of the transfer function 255, referred to herein as the linear field of view of the SAL seeker. Given ΔX and ΔY, the transfer function 255 in the linear region 260 determines the angle of the guidance system from the target (e.g. target bearing). When energy is hitting only two quadrants, the guidance system operates outside the linear region, where the transfer function nears ±1 for ΔX or ΔY. In this circumstance, the guidance system only knows the direction towards the target, but not its true angle. The size of the spot 245 may affect the performance of the guidance system. For example, a small spot tends to move off of overlapping multiple detector areas faster than a big spot. A larger spot improves the transfer function by making a relatively wide transfer function thereby covering larger angles off boresight.

As discussed above, in conventional shared aperture multimode seekers, the SAL seeker typically has a small linear field of view (for example, approximately ±3°), which is unsuitable for non-gimbaled systems. Accordingly, aspects and embodiments use a dual-mode diffuser to expand the linear field of view of the SAL seeker (increase the linear region 260 of the transfer function), without negatively impacting the performance of the IIR seeker. In particular, the dual-mode diffuser may be used to spread the laser energy and thereby enlarge the spot 245 to expand the linear field of view, as discussed in more detail below.

Figure 4:
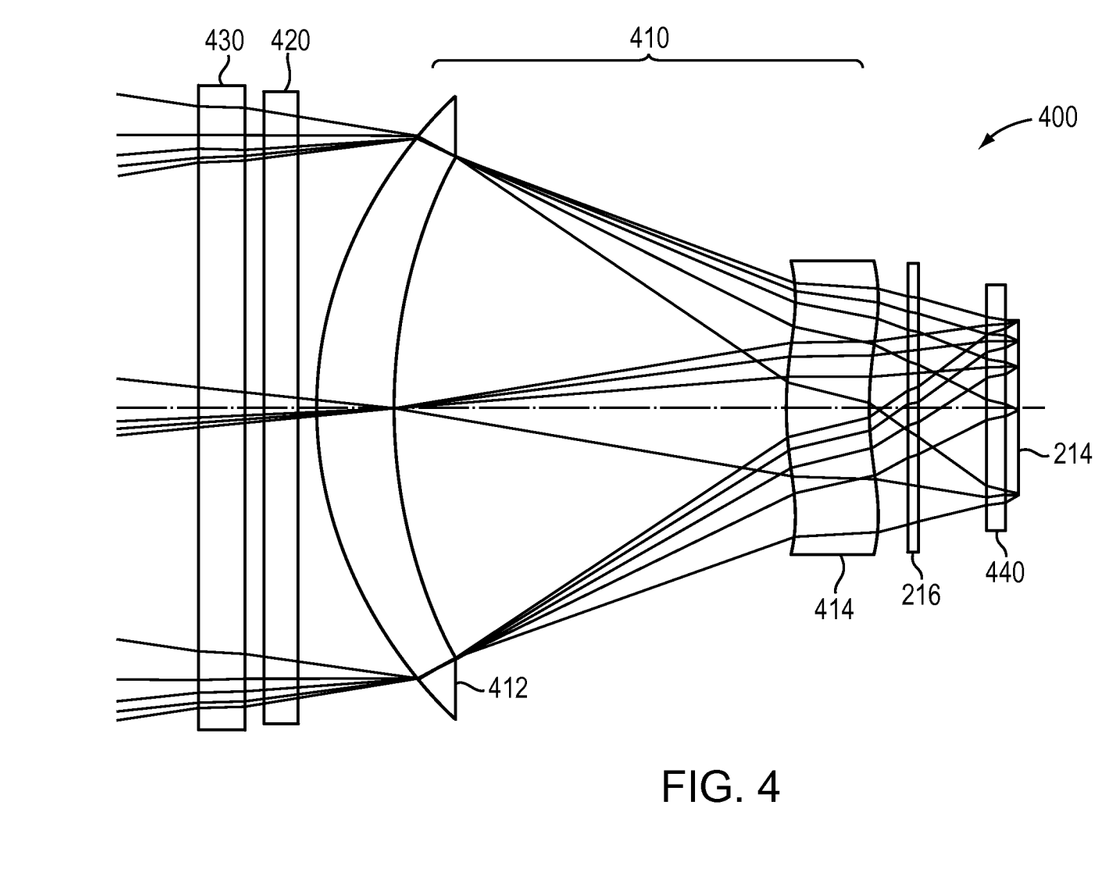
FIG. 4 is ray trace of one example of a dual-mode SAL seeker according to aspects of the invention.

Referring to FIG. 4 there is illustrated a ray trace of one example of a shared aperture dual-mode seeker system 400 including a quadrant TSAL detector 216 and focal plane array detector 214. The system 400 further includes a dual-mode diffuser 420, and a window 430. In one example the focal plane array detector 214 is an LWIR detector. Element 440 represents an optional window on the LWIR detector. As discussed above, an optical system 410 is used to direct and focus incident infrared radiation onto the focal plane array detector 214. In the example illustrated in FIG. 4, the optical system 410 is a refractive system and includes two lenses 412, 414. However, numerous other configurations, including refractive configurations, reflective configurations, or combinations thereof, may be implemented for the optical system 410, provided that the optical system functions to direct incident infrared radiation to the focal plane array detector 214 and is sufficiently optically transparent to the laser energy wavelengths to allow the laser energy to pass through to the TSAL detector 216.

The window 430 may function to shield the components of the multimode seeker from the outside environment and from the air stream when the multimode seeker is in flight. The window 430 may be essentially flat, as shown in FIG. 4, or may be a dome having an approximately spherical, conical, or some other, shape. The shape of the window 430 may be selected for a combination of optical and aerodynamic properties.

The diffuser 420 is a dual-mode diffuser configured to operate as a diffuser at the SAL seeker wavelength (for example, 1.064 microns), and to be transmissive in the zero diffractive order (electromagnetic radiation is undiffracted) in the IIR spectral band (for example, the LWIR spectral band). According to one embodiment, this functionality of the diffuser 420 is achieved by patterning at least one surface (i.e., the front or back surface) of the diffuser with features sizes that are sufficiently small so as to pass the IIR seeker wavelengths without diffraction. In one example, the feature sizes are approximately 1-2 microns. The pattern of features may be selected to achieve diffraction of the SAL seeker wavelength to spread the electromagnetic radiation and increase the spot size 245 on the SAL detector 216, and thereby widen the linear field of view of the SAL seeker. The diffuser 420 may be configured to expand the linear field of view of the SAL seeker to greater than ±10°. In one example, the spreading of the SAL seeker wavelength by the diffuser 420 broadens the linear field of view to approximately ±12°, which is sufficient to enable use of the SAL seeker in strap-down systems. Without the diffuser, the linear field of view of the SAL seeker is typically limited to no more than approximately ±3°.

The irradiance pattern of the diffuser 420 may impact the resulting linear field of view of the SAL seeker. In certain examples, the diffuser 420 is designed with an irradiance pattern having a top-hat (uniform) or Gaussian distribution. However, other irradiance patterns may be used in other examples.

The diffuser 420 includes a substrate on which the pattern of features is formed. The substrate may be any suitable material that is sufficiently optically transparent at the laser waveband and the IIR waveband. In one example, the substrate is barium fluoride (BaF2). In one example the pattern of features is formed on the surface of the diffuser 420 by an additive "lift-off" procedure. In another example, the pattern of features is formed on the surface of the diffuser 420 using a subtractive processing, such as etching.

Figure 5A:
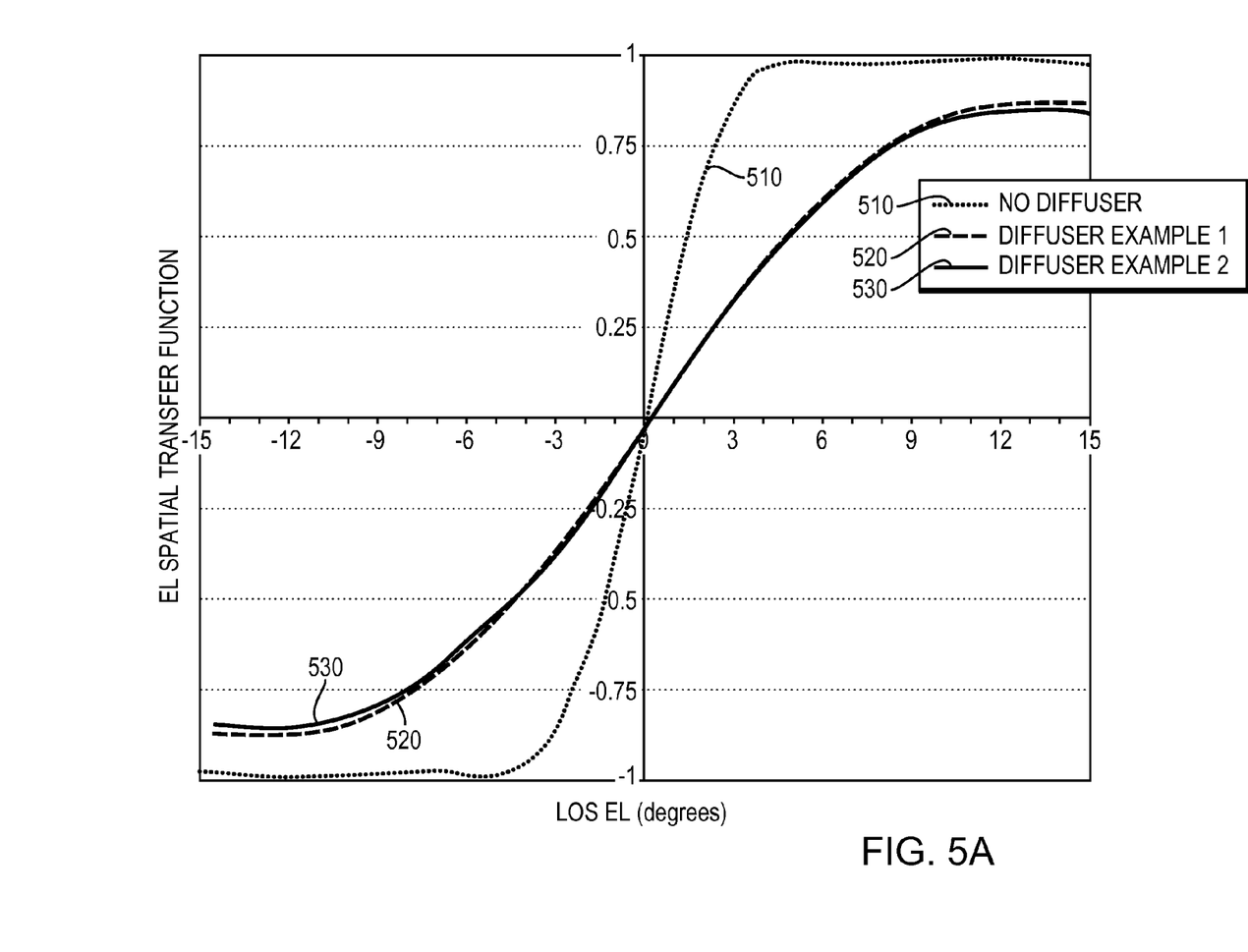
FIG. 5A is a graph of the elevation spatial transfer function of an example of the SAL detector 216 with and without the examples of the diffuser.
Figure 5B:
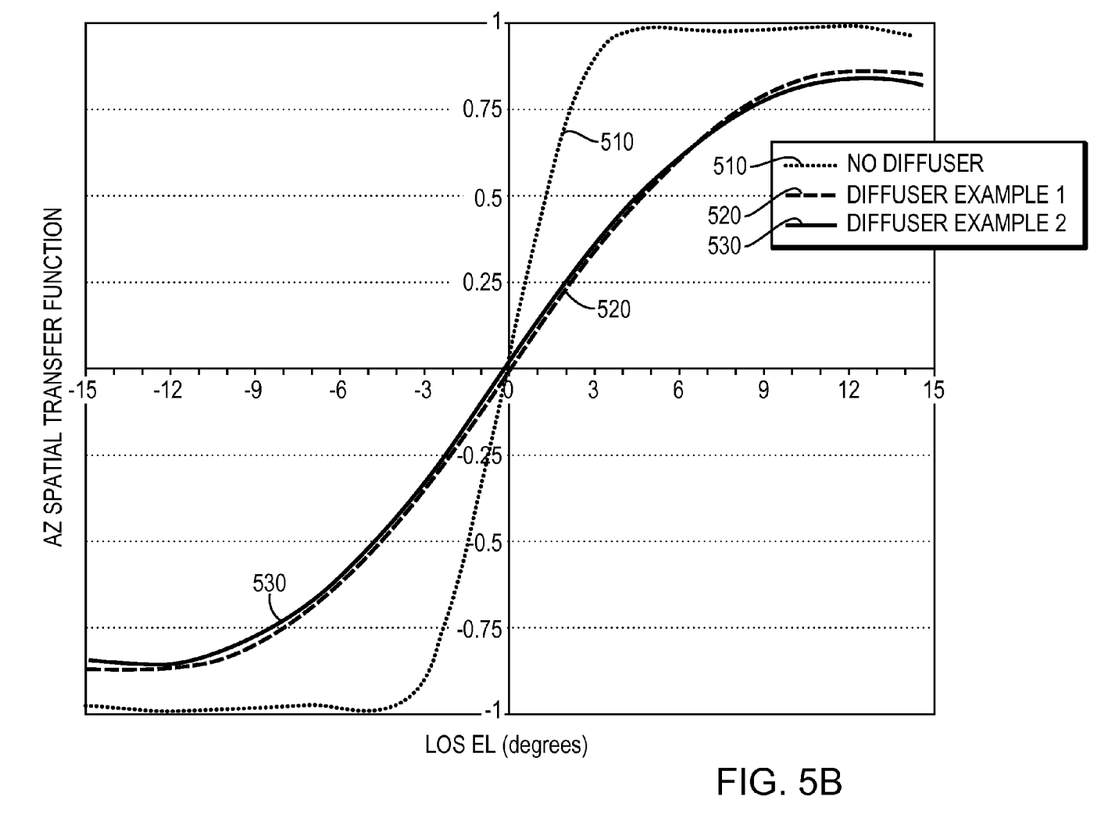
FIG. 5B is a graph of the azimuth spatial transfer function of the example of the SAL detector 216 with and without the examples of the diffuser.

Referring to FIGS. 5A and 5B there are illustrated examples of the spatial transfer function of the SAL detector 216 used in an embodiment of the system of FIG. 4. FIG. 5A illustrates the elevation transfer functions, and FIG. 5B illustrates the azimuth transfer functions. Trace 510 represents the transfer functions without the diffuser 420. As discussed above, it can be seen that the linear field of view in this case is less than about ±3°. Trace 520 represents the transfer functions with one example of the diffuser 420 present in the system of FIG. 4, and trace 530 represents the transfer functions obtained with another example of the diffuser 420. In both examples, the diffuser 420 had a top-hat irradiance pattern, and the wavelength of the laser energy was 1.064 microns. In the first example (corresponding to trace 520), the diffuser 420 was fabricated using an additive "lift-off" procedure on a barium fluoride substrate. In the second example (corresponding to trace 530), the diffuser 420 was fabricated using an etching process on a barium fluoride substrate. As can be seen with reference to FIGS. 5A and 5B, the use of the diffuser 420 broadens the linear region of the transfer function substantially relative to the "no diffuser" case.

Thus, referring again to FIG. 4, both wavebands (e.g., 1.064 micron and 8-12 micron electromagnetic radiation) enter the SAL seeker system 400 via the window 430 and pass through the diffuser 420 and optical system 410 to the respective detectors 216 and 214. The diffuser 420 acts to spread the laser waveband to form a defocused spot on the TSAL detector 216, thereby extending the linear field of view of the SAL seeker system, while allowing the IIR waveband to pass through undiffracted. In one example, the diffuser 420 causes minimal Fresnel and/or absorption losses in the IIR waveband, but otherwise allows the infrared electromagnetic radiation to pass through as though the diffuser were not present. The optical system 410 is sufficiently optically transparent or transmissive to allow the laser waveband to pass through to the TSAL detector 216, and acts to focus the IIR waveband onto the focal plane array detector 214. Thus, the aperture of the seeker system 400 may be completely shared by both wavebands.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A non-gimbaled multimode seeker comprising:
   an imaging infrared (IIR) seeker including a focal plane array detector and an optical system configured to receive infrared radiation via a system optical aperture and focus the infrared radiation onto the focal plane array detector;
   a semi-active laser (SAL) seeker including a SAL detector positioned in an optical path between the system optical aperture and the focal plane array detector and configured to detect laser radiation received via the system optical aperture, the SAL detector being substantially transparent to the infrared radiation; and
   a dual-mode diffuser positioned in the optical path between the system optical aperture and the optical system, and configured to spread the laser radiation to broaden a linear field of view of the SAL seeker, the diffuser further configured to transmit the infrared radiation substantially undiffracted to the optical system.

2. The non-gimbaled multimode seeker of claim 1, wherein the diffuser includes a substrate having a pattern of features on a surface thereof, the pattern of features configured to diffract the laser radiation substantially without diffracting the infrared radiation.

3. The non-gimbaled multimode seeker of claim 2, wherein a feature size of the pattern of features is in a range of approximately 1-2 microns.

4. The non-gimbaled multimode seeker of claim 3, wherein the laser radiation has a wavelength of approximately 1.064 microns.

5. The non-gimbaled multimode seeker of claim 3, wherein the infrared radiation includes wavelengths in a range of approximately 8-12 microns.

6. The non-gimbaled multimode seeker of claim 2, wherein the substrate is barium fluoride.

7. The non-gimbaled multimode seeker of claim 1, wherein the optical system includes a pair of lenses.

8. The non-gimbaled multimode seeker of claim 1, further comprising a window that is substantially optically transparent to the infrared radiation and the laser radiation.

9. The non-gimbaled multimode seeker of claim 1, wherein the diffuser is configured to broaden the linear field of view of the SAL seeker to approximately ±12°.

10. A method of operating a non-gimbaled multimode seeker comprising:
    receiving infrared radiation and laser radiation through a common aperture;
    passing the infrared radiation substantially undiffracted through a dual-mode diffuser, and focusing the infrared radiation onto an imaging detector;
    diffracting the laser radiation with the dual-mode diffuser to broaden a beam diameter of the laser radiation; and
    detecting the diffracted laser radiation with a semi-active laser (SAL) detector.

11. The method of claim 10, wherein focusing the infrared radiation onto the imaging detector includes passing the infrared radiation through the SAL detector.

12. The method of claim 11, wherein receiving the infrared radiation and the laser radiation includes passing the infrared radiation and the laser radiation though a window that is substantially optically transparent to the infrared radiation and the laser radiation.

13. The method of claim 11, wherein receiving the infrared radiation and the laser radiation includes receiving infrared radiation in wavelength range of approximately 8-12 microns, and receiving laser radiation having a wavelength of approximately 1.064 microns.

14. The method of claim 11, wherein diffracting the laser radiation includes broadening the beam diameter of the laser radiation to produce a linear field of view of the SAL detector of approximately ±12°.

15. A non-gimbaled multimode seeker comprising:
    an infrared imaging detector configured to detect focused incident infrared radiation received via a common aperture and to generate at least one infrared guidance signal therefrom;
    a positionally-sensitive semi-active laser (SAL) detector having a spatial transfer function that converts a spatial displacement of a spot of laser radiation to a target bearing to generate at least one SAL guidance signal, the laser radiation being received via the common aperture;
    a dual-mode diffuser positioned in an optical path between the common aperture and the SAL detector and the infrared imaging detector, and configured to diffract the laser radiation to increase the size of the spot of laser radiation on the SAL detector to set the spatial transfer function, and further configured to pass the infrared radiation substantially undiffracted to the infrared imaging detector.

16. The non-gimbaled multimode seeker of claim 15, further comprising an optical sub-system positioned between the dual-mode diffuser and the infrared imaging detector and configured to focus the infrared radiation onto the infrared imaging detector.

17. The non-gimbaled multimode seeker of claim 15, wherein the SAL detector is positioned in the optical path between the dual-mode diffuser and the infrared imaging detector and is configured to be substantially optically transparent to the infrared radiation.

18. The non-gimbaled multimode seeker of claim 15, wherein the dual-mode diffuser includes a substrate having a pattern of features on a surface thereof, the pattern of features configured to diffract the laser radiation substantially without diffracting the infrared radiation.

19. The non-gimbaled multimode seeker of claim 18, wherein the infrared radiation includes wavelengths in a range of approximately 8-12 microns, and the laser radiation has a wavelength of approximately 1.064 microns.

* * * * *